(12) United States Patent
Bez et al.

(10) Patent No.: US 10,603,950 B2
(45) Date of Patent: Mar. 31, 2020

(54) HAND HELD DEVICE HAVING TWO HEADS THAT ARE RETRACTABLE BY MEANS OF A SINGLE BUTTON

(71) Applicant: SOCIETE BIC, Clichy (FR)

(72) Inventors: Arnaud Bez, Garches (FR); Samuel Malinverni, Paris (FR)

(73) Assignee: SOCIETE BIC, Clichy (FR)

( * ) Notice: Subject to any disclaimer, the term of this patent is extended or adjusted under 35 U.S.C. 154(b) by 0 days.

(21) Appl. No.: 16/302,309

(22) PCT Filed: May 11, 2017

(86) PCT No.: PCT/FR2017/051131
§ 371 (c)(1),
(2) Date: Nov. 16, 2018

(87) PCT Pub. No.: WO2017/198929
PCT Pub. Date: Nov. 23, 2017

(65) Prior Publication Data
US 2019/0193455 A1    Jun. 27, 2019

(30) Foreign Application Priority Data
May 17, 2016  (FR) .................................... 16 54362

(51) Int. Cl.
*B43K 24/16*    (2006.01)
*B43K 29/00*    (2006.01)
(Continued)

(52) U.S. Cl.
CPC .............. *B43K 24/16* (2013.01); *A45D 40/24* (2013.01); *B43K 29/00* (2013.01);
(Continued)

(58) Field of Classification Search
CPC ........ B43K 24/16; B43K 29/00; B43K 24/10; B43K 24/12; B43K 29/02; B43K 24/084;
(Continued)

(56) References Cited

U.S. PATENT DOCUMENTS 3,985,455 A   10/1976  Wahlberg
4,000,950 A   1/1977   Wahlberg
(Continued)

FOREIGN PATENT DOCUMENTS

FR   2996805      4/2014
WO   2005047016   5/2005
WO   2014191680   12/2014

OTHER PUBLICATIONS

International Search Report dated Aug. 24, 2017 from corresponding International PCT Patent Application No. PCT/FR2017/051131, 5 pages.

*Primary Examiner* — David J Walczak
(74) *Attorney, Agent, or Firm* — Ohlandt, Greeley, Ruggiero & Perle, L.L.P.

(57) ABSTRACT

A hand held device presenting a first head and a second head that are movable axially between a position for use and a retracted position, and a single side button configured to bring the first head and the second head, independently of each other, from the retracted position to the position for use and vice versa, the side button cooperating with a first ratchet mechanism in order to cause the first head to pass from the retracted position to the position for use and vice versa, and with a second ratchet mechanism in order to cause the second head to pass from the retracted position to the position for use and vice versa.

7 Claims, 5 Drawing Sheets

(51) Int. Cl.
    *B43K 24/08*     (2006.01)
    *B43K 24/10*     (2006.01)
    *B43K 24/12*     (2006.01)
    *B43K 29/02*     (2006.01)
    *A45D 40/24*     (2006.01)
    *G06F 3/0354*     (2013.01)

(52) U.S. Cl.
    CPC ........ *G06F 3/03545* (2013.01); *B43K 24/082* (2013.01); *B43K 24/084* (2013.01); *B43K 24/10* (2013.01); *B43K 24/12* (2013.01); *B43K 29/02* (2013.01)

(58) Field of Classification Search
    CPC ...... B43K 24/082; B43K 24/00; B43K 24/02; B43K 24/04; B43K 24/08; A45D 40/205; A45D 40/24; A45D 2040/207; G06F 3/03545; G06F 3/03547
    See application file for complete search history.

(56) References Cited

U.S. PATENT DOCUMENTS

| | | |
|---|---|---|
| 5,184,908 A | 2/1993 | Yamamoto et al. |
| 2016/0116999 A1 | 4/2016 | Boisdevesys et al. |

HAND HELD DEVICE HAVING TWO HEADS THAT ARE RETRACTABLE BY MEANS OF A SINGLE BUTTON†

FIELD OF THE INVENTION

The invention relates to a longitudinally elongate hand held device with two heads that are each mounted to be retractable at a respective end of the hand held device. The invention relates particularly, but not necessarily to writing instruments.

PRIOR ART

Known hand held devices having two retractable heads generally do not give complete satisfaction from the points of view of ergonomics, bulkiness, and reliability. There therefore exists a need in this sense.

SUMMARY OF THE INVENTION

An embodiment provides a hand held device extending along an axis, comprising a casing presenting a first distal end and a second distal end opposite the first distal end along the axis, a first head that is movable axially between a position for use in which the first head projects from the casing from the first end and a retracted position in which the first head is retracted inside the casing, a second head that is movable axially between a position for use in which the second head projects from the casing from the second end and a retracted position in which the second head is retracted inside the casing, and a single side button that is configured to bring the first head and the second head, independently of each other, from the retracted position to the position for use and vice versa, the side button cooperating with a first ratchet mechanism in order to cause the first head to pass from the retracted position to the position for use and vice versa, and with a second †Translation of the title as established ex officio. ratchet mechanism in order to cause the second head to pass from the retracted position to the position for use and vice versa, wherein each ratchet mechanism respectively comprises a first and a second piston, a first and a second rotary cam, a first and a second stationary cam respectively receiving the first and the second rotary cam, and a first and a second spring.

It should be understood that the heads are arranged axially opposite from each other within the hand held device. It should also be understood that the single side button makes it possible to retract/extend the first and second heads into/out from the casing, independently of each other. Naturally, the casing may be formed by a single part, or by a plurality of parts. The casing therefore forms the outer portion of the hand held device. By way of example, for a writing instrument, e.g. a pen, the casing is formed by the outer cylinder of the pen.

It should be understood that the heads may be formed by any hand held device tool endpiece, e.g. the endpiece of a wrench, a screwdriver, a blade, a punch, a writing body (felt tip, ballpoint tip, or other tip, and fitted with an ink reservoir, mechanical pencil, graphite pencil lead, chalk, or any other means making it possible to write on a substrate), a brush, an eraser, a friction body, a pad for a capacitive screen, a cosmetic applicator (makeup brush, pencil, mascara brush, roll-on applicator, lipstick, or any other means for applying cosmetics), etc.

Each head is retractable by means of a respective ratchet mechanism, which mechanisms are independent from each other, the button making it possible to actuate each of the ratchet mechanisms, independently of each other in order to retract/extend each of the first and second heads independently of each other into/out from the first and second distal ends of the casing, respectively.

The ratchet mechanisms are known mechanisms, each comprising a piston, a rotary cam, a stationary cam, and a spring, e.g. a spring working in compression. The rotary cam cooperates axially, directly or indirectly with the piston, with the stationary cam, and with the spring. By actuating the piston axially, the piston pushes the rotary cam axially against the spring, the rotary cam pivoting during its axial movement, and then the piston cooperates in abutment with various teeth of the stationary cam by means of the spring when the pressure on the piston is released. Thus, the rotary cam is movable axially between two distinct axial positions, as a function of the axial position of the teeth of the stationary cam with which the movable cam cooperates. Thus, by cooperating directly or indirectly with a head, the rotary cam thus brings said head to a position for use or to a retracted position.

By way of example, the button may be interposed axially between the two ratchet mechanisms.

Thus, such a hand held device is ergonomic because of its single side button. The combination of a single button for controlling both ratchet mechanisms, and the general compactness of ratchet mechanisms enables the hand held device to be more compact, having dimensions suitable for the hands of the majority of users. Finally, since ratchet mechanisms are reliable, the hand held device is consequently also reliable.

In some embodiments the side button is movable axially and includes a single slider cooperating in abutment along the axis both with the first piston and with the second piston.

It should be understood that the slider is an element of the button that is arranged inside the casing and that cooperates with the first and second pistons. By way of example, the slider is arranged axially between the first piston and the second piston. Thus, by actuating the button in a first axial direction, the slider is brought into abutment with the first piston, whereby the first ratchet mechanism is actuated and the first head is brought into the position for use or into the retracted position, while actuating the button in a second axial direction, opposite to the first direction, the slider is brought into abutment with the second piston, whereby the second ratchet mechanism is actuated and the second head is brought into the position for use or into the retracted position. Thus, depending on whether the button is actuated in one direction or the other, one head is brought into one position or the other, and this is done independently of the other head. Such a structure is particularly compact, and its simplicity gives it great reliability. In addition, the movement of the button in one direction in order to actuate one head, and in the other direction in order to actuate the other head is fairly intuitive, which makes the hand held device quite ergonomic.

In some embodiments, the slider presents a first concavity and a second concavity, both extending axially, the first concavity being oriented towards the first head and configured to receive the first piston, while the second concavity is oriented towards the second head and configured to receive the second piston.

By receiving the pistons, the concavitys guide the pistons and ensure the slider is in alignment with the pistons. Such concavitys therefore make it possible to ensure axial alignment between the pistons and the slider, and does so whatever the axial position of the slider relative to each of the pistons. Reliability is therefore improved.

By way of example, the concavitys are formed by cups. It should therefore be understood that in this example, the cups are arranged axially back-to-back.

In some embodiments, the slider presents at least one radial projection configured to limit radial movements of the slider within the casing.

Naturally, "radial" is perpendicular to "axial". These radial projections make it possible to guide the slider axially inside the casing and to avoid the slider deviating radially within the casing, e.g. when the user presses on the button in order to actuate it. It is thus ensured that the slider and the pistons remain axially in alignment, whereby the reliability of the hand held device is further improved.

In some embodiments, the first head cooperates with the first rotary cam by bearing against it, while the second head is mounted on the second rotary cam.

Such a structure makes it possible to house inside the casing a portion of the head that presents an elongate structure, e.g. a writing body, a mechanical pencil, etc., said head being guided axially by the casing while mere cooperation with the rotary cam by bearing against it suffices to retract/extend the head (or an end of the head) into/out from the casing. In addition, this structure makes it possible to house a head of the structure that is difficult to guide by means of the casing, e.g. an eraser or a pad for a capacitive screen, with the head then being held in place by mounting said head on the rotary cam. Such a structure makes it possible to optimize holding of the heads within the hand held device, and therefore its robustness, and in addition makes it possible to optimize compactness of the inside structure of the hand held device, and therefore, consequently, the overall compactness of the hand held device.

It should be understood that the head may be mounted on the rotary cam directly or indirectly. Naturally, this mounting of a head on a rotary cam may be performed in any device other than the hand held device having two heads described in the present description. In particular, mounting a head in this way is particularly advantageous when it is difficult to make the spring cooperate with the head, whether for structural reasons or because of the strength/wear/fragility of the head. Specifically, having the head mounted on the rotary cam while the spring cooperates with the rotary cam and not with the head satisfies such design constraints.

In some embodiments, the first head is a writing body, while the second head is a pad for a capacitive screen.

It can be understood that the pad is a termination configured to interact with a capacitive screen. The pad is conductive (because of the material from which it is made, or because of a coating). The shape, the flexibility/stiffness, and the material(s) of a pad are not limited, providing the pad is capable of interacting with a capacitive screen, i.e. providing the screen can detect it making contact therewith.

In some embodiments, the first head is a writing body with thermochromic ink, while the second head is a friction body for changing the color of the thermochromic ink deposited on a substrate by means of said writing body.

The structure of the hand held device is particularly well adapted for writing instruments, e.g. including firstly a writing body, and secondly an eraser, a friction body, or a pad for a capacitive screen.

BRIEF DESCRIPTION OF THE DRAWINGS

The invention and its advantages can be better understood on reading the detailed description of various embodiments of the invention given as non-limiting examples. The description refers to the accompanying sheets of figures, in which.

DETAILED DESCRIPTION OF EXAMPLES

Figure 1:
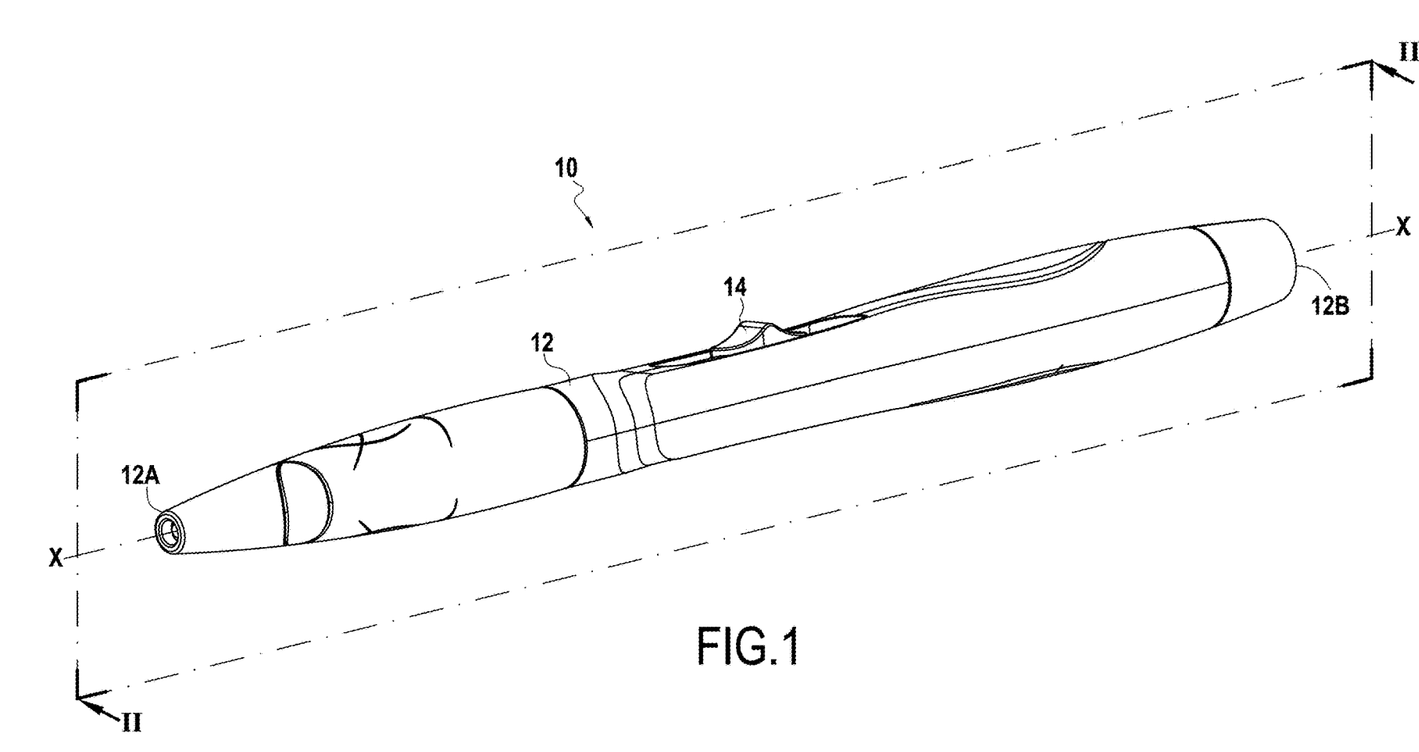
FIG. 1 shows a hand held device seen in perspective.
Figure 2:
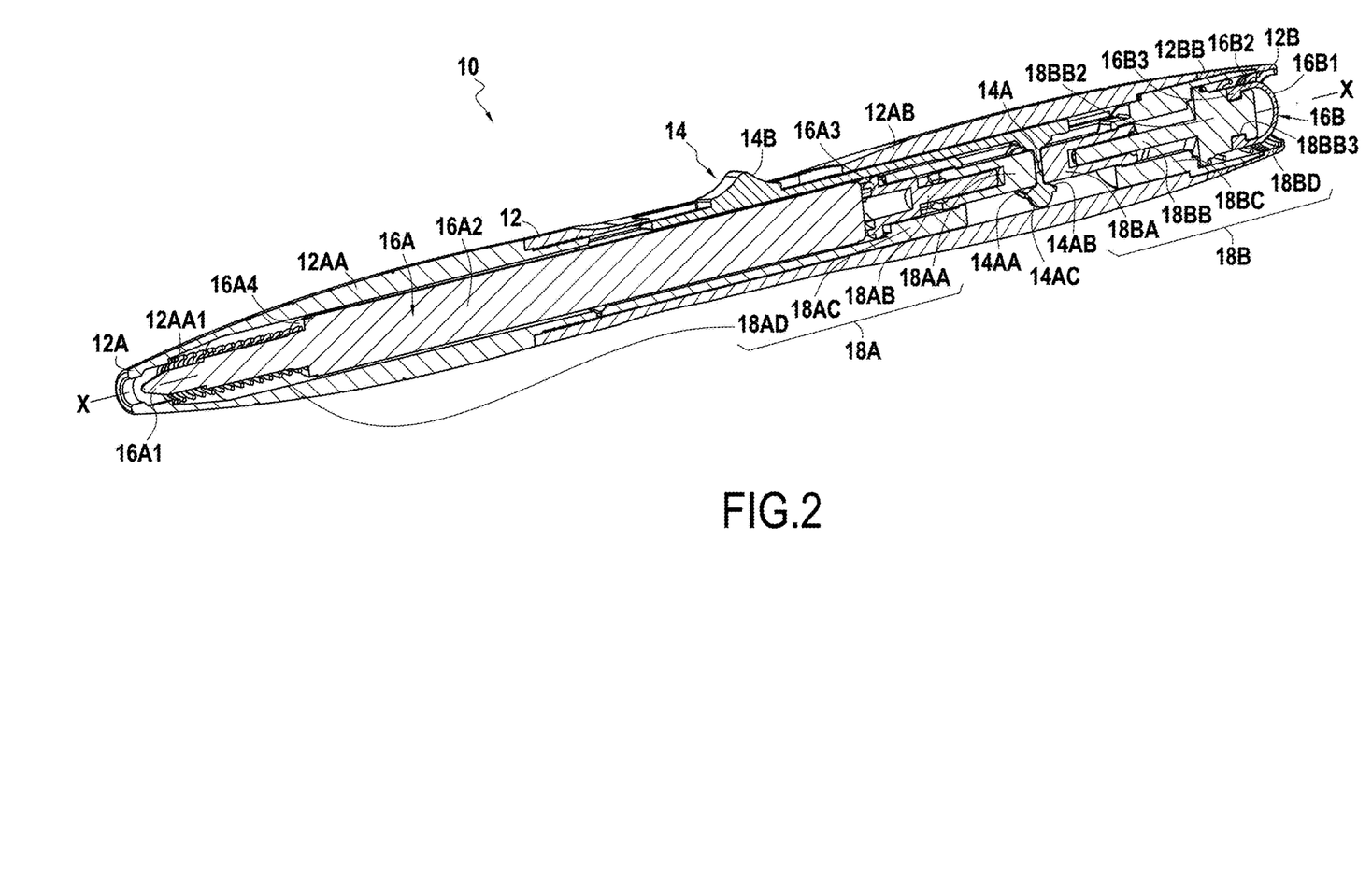
FIG. 2 shows the FIG. 1 hand held device in section on section plane II.
Figure 3:
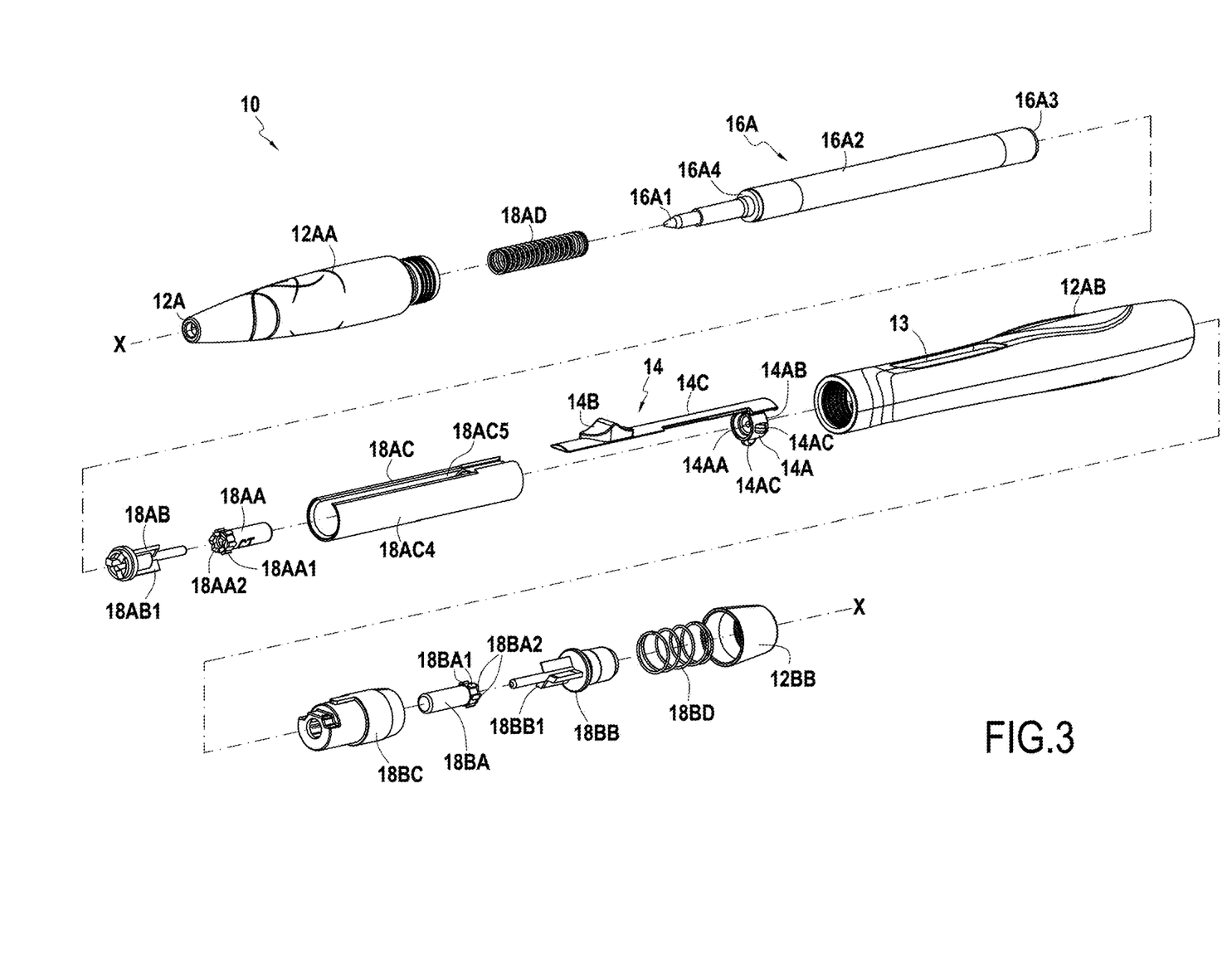
FIG. 3 shows the FIG. 1 hand held device, in an exploded view.

FIGS. 1, 2, and 3 show a hand held device 10, in this example a writing instrument 10, extending along an axis X and including two heads 16A and 16B that are mounted in a casing 12 and that are retractable by means of a single side button 14. The casing presents a first distal end 12A and a second distal end 12B that is opposite the first distal end along the axis X. The first head 16A is movable axially between a retracted position in which it is retracted inside the casing 12 and a position for use in which it projects from the casing 12 from the first distal end 12A. In addition, the second head 16B is movable axially between a retracted position in which it is retracted inside the casing 12 and a position for use in which it projects from the casing 12 from the second distal end 12B. FIGS. 1 and 2 show the first and second heads 16A and 16B in the retracted position.

More precisely, with reference to FIG. 3, the casing 12 comprises three portions: a first cylinder 12AA, a second cylinder 12AB, and a third cylinder 12BB. The first cylinder 12AA and the second cylinder 12AB are assembled together by screw-fastening. The free end of the first cylinder 12AA defines the first end 12A of the casing 12. The third cylinder 12BB is assembled by snap-fastening on the stationary cam 18BC described below, while the stationary cam 18BC is itself mounted by snap-fastening inside the second cylinder 12AB, the snap-fastener means not being shown. Thus, the second cylinder 12AB forms an intermediate cylinder along the axis X between the first cylinder 12AA and the third cylinder 12BB. The free end of the third cylinder 12BB forms the second end 12B of the casing 12.

The intermediate cylinder 12AB presents a side slot 13 extending along the axis X and through which there extends a grip portion 14B for operating the button 14 so that the user is able to actuate the button 14. The axial length of the slot 13 is great enough for the button 14 to be able to be moved towards the first distal end 12A and towards the second distal end 12B along the axis X.

The button 14 presents a single slider 14A, the grip portion 14B, and a rod 14C connecting the grip portion 14B and the slider 14A together. The slider 14A presents a first concavity 14AA and a second concavity 14AB, each of these concavitys extending axially (i.e. being oriented) in opposite directions. In this example, the concavitys are formed by cups 14AA and 14AB. In addition, the slider 14A presents radial projections 14AC, in this example three radial projections distributed at 90° intervals in pairs around the axis and at 90° from the point where the rod 14C and the slider 14A join each other. These projections 14AC are configured to limit radial movements of the slider 14A inside the casing 12, in this example inside the second cylinder 12AB.

The button 14 cooperates with a first ratchet mechanism 18A and with a second ratchet mechanism 18B. The first ratchet mechanism 18A comprises a first piston 18AA, a first rotary cam 18AB, a first stationary cam 18AC, and a first spring 18AD. The second ratchet mechanism 18B comprises a second piston 18BA, a second rotary cam 18BB, a second stationary cam 18BC, and a second spring 18BD.

In this example, considered along the axis X, the button 14 is interposed between the first and second ratchet mechanisms 18A and 18B. The slider 14A of the button 14 is arranged between the first piston 18AA and the second piston 18BA. The button 14 is movable along the axis X, and cooperates in abutment, via the slider 14A both with the first piston 18AA and also with the second piston 18BA. In addition, the cup 14AA of the slider 14A is configured to receive the first piston 18AA, while the cup 14AB is configured to receive the second piston 18BA. In this example, the annular edge of each of the cups 14AA and 14AB is substantially frustoconical, in such a manner as to form a centering device when a piston is approaching, by means of which the piston is centered on the axis of said cup, and is aligned on the axis X with the slider 14A.

In this example, the first and second pistons 18AA and 18BA are identical. These pistons present respective axial splines 18AA1 and 18BA1 and respective rings of teeth 18AA2 and 18BA2. The axial splines 18AA1 and 18BA1 cooperate respectively with grooves 18AC1 and 18BC1 in the stationary cams 18AC and 18BC, while the rings of teeth 18AA2 and 18BA2 cooperate respectively with the teeth 18AB1 and 18BB1 of the rotary cams 18AB and 18BB.

Figure 4:
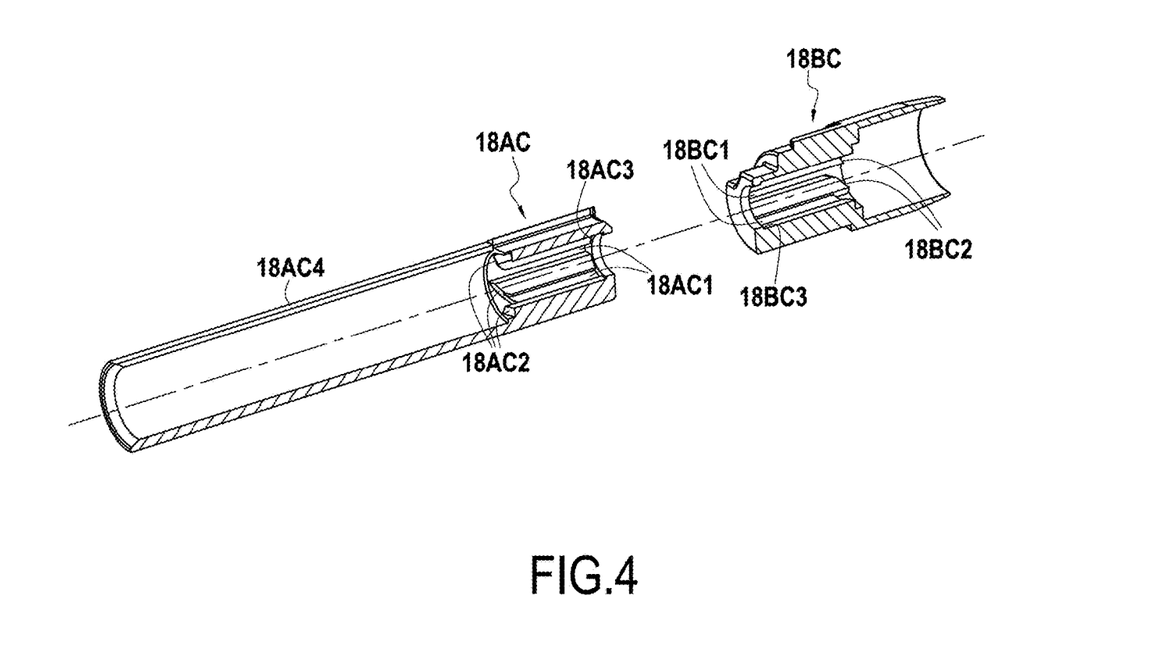
FIG. 4 is a section view of the stationary cams.

It should be observed that the grooves 18AC1 and 18BC1 in the stationary cams 18AC and 18BC are deeper or shallower radially, and they alternate in pairs circumferentially (i.e. one deeper groove, one shallower groove, one deeper groove, etc.). The axial ends of the shallower grooves form a shoulder arranged in continuity with the teeth 18AC2 and 18BC2.

Thus, the pistons 18AA and 18BA are blocked against rotation about the axis X (i.e. circumferentially) by means of the splines 18AA1 and 18BA1 engaging in the grooves 18AC1 and 18BC1, respectively. By pushing the pistons 18AA and 18BA axially, the teeth 18AA2 and 18BA2 cooperate respectively with the teeth 18AB1 or 18BB1 of the rotary cams 18AB or 18BB, whereby the rotary cams are pushed axially until they disengage respectively from the grooves 18AC1 or 18BC1 of the stationary cams 18AC or 18BC. As a result of the inclined faces of the teeth 18AA2 and 18BA2 of the pistons 18AA and 18BA and of the teeth 18AB1 and 18BB1 of the rotary cams 18AB and 18BB, once the rotary cams 18AB and 18BB are disengaged from the grooves they turn about the axis X (i.e. circumferentially), and the teeth 18AB1 and 18BB1 engage respectively with the teeth 18AC2 and 18BC2 that are circumferentially adjacent. Thus, with the grooves of the stationary cams alternating as deeper and shallower grooves, the teeth 18AB1, 18BB1 of the rotary cams then find themselves either blocked axially at the teeth 18AC2, 18BC2 (i.e. cooperating axially in abutment against an axial end of a shallower groove), or else engaged and sliding axially in a deeper groove so as to abut respectively against the pistons 18AA and 18BA, these pistons cooperating in abutment against the corresponding shoulders 18AC3 and 18BC3 of the first and second stationary cams 18AC and 18BC. Thus, the rotary cams take up two distinct axial positions in alternation corresponding respectively to the retracted position and to the working position of the heads. The springs 18AD and 18BD push the respective rotary cams 18AB and 18BB axially against the stationary cams or against the pistons, depending on the position adopted.

In this example, the first stationary cam 18AC presents a sheath portion 18AC4 and a side groove 18AC5. The side groove 18AC5 receives the rod 14C of the button 14 in sliding along the axis X, which makes it possible to guide the button 14 in sliding along the axis X and to avoid any rotary movement about the axis X. The sheath portion 18AC4 receives a portion of the first head 16A, which makes it possible to maintain the alignment along the axis X between the first head 16A and the first rotary cam 18AB, and does so whatever the position of the first rotary cam 18AB. The first stationary cam 18AC is mounted in the second cylinder 12B by snap-fastening, the snap-fastener means not being shown.

Each of the rotary cams 18AB and 18BB cooperates with a respective head, the first rotary cam 18AB cooperating with the first head 16A while the second rotary cam 18BB cooperates with the second head 16B. More precisely, in this example, the first head 16A is a writing body, in this example a ballpoint tip 16A1 mounted on an ink reservoir 16A2. The axial end 16A3 of the writing body 16A opposite from its writing tip 16A1 cooperates with the first rotary cam 18AB1 by being caused to bear axially against it by means of the spring 18AD. The spring 18AD is a spring working in compression, bearing firstly against an axial shoulder 12AA1 of the casing 12, and more particularly in this example of the first cylinder 12AA, and secondly against a shoulder 16A4 of the writing body 16A. Thus, the spring 18AD of the first ratchet mechanism 18A cooperates with the first rotary cam 18AB1 indirectly, by means of the first head 16A.

The second head 16B is a pad for a capacitive screen. The pad 16B presents a distal end 16B1 for cooperating with a capacitive screen, this end 16B1 in this example being substantially in the form of a hollow hemisphere. The end 16B1 extends from a fastener portion 16B2 that is substantially in the form of a hollow cylinder. The fastener portion 16B2 has a collar 16B3 arranged in the vicinity of the free end of the fastener portion 16B2, on the inside of the fastener portion 16B2. The collar 16B3 cooperates by snap-fastening in an annular groove 18BB3 formed in the mounting base 18BB2 formed by a portion of the second rotary cam 18BB. In the position for use, the radial space between the pad 16B, and more particularly the fastener portion 16B2, and the third cylinder 12BB is small enough to ensure that the collar 16B3 remains engaged in the groove 18BB3 and provides reliable mounting of the pad 16B on the second rotary cam 18BB while the pad 16B is in use.

In addition, in order to ensure that the pad 16B operates correctly, i.e. to ensure that it is capable of interfering/interacting with a capacitive screen in such a manner that its presence at a given point of said capacitive screen can be detected by the screen, at least the second rotary cam 18BB and stationary cam 18BC, and also the second cylinder 12AB are all electrically conductive so that electrical contact can be established between the pad 16B and a user's hand while operating the hand held device 10 via the second cylinder 12AB. By way of example, the second rotary cam 18BB and the second stationary cam 18BC, and also the second cylinder 12AB may be made of electrically-conductive plastic, e.g. plastic filled with carbon black or carbon nanotubes, or more generally filled with any type of conductive filler known to the person skilled in the art.

Naturally, the system for mounting the pad on a rotary cam of the ratchet mechanism is not limited to a hand held device with two heads, and may be transposed to any hand held device presenting a single head or more than two heads.

In a variant that is not shown, the first head 16A contains thermochromic ink in the reservoir 16A2 while the second head 16B is not hollow and forms a friction body for causing thermochromic ink that has been placed on a substrate by means of the first head 16A, to change color by means of friction.

Figure 5A:
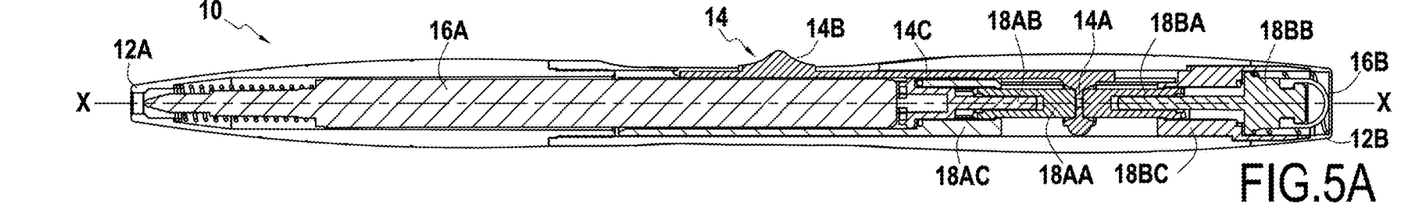
FIGS. 5A, 5B, 5C, and 5D show the different configurations of the hand held device depending on whether the heads are in the position for use or in the retracted position.
Figure 5B:
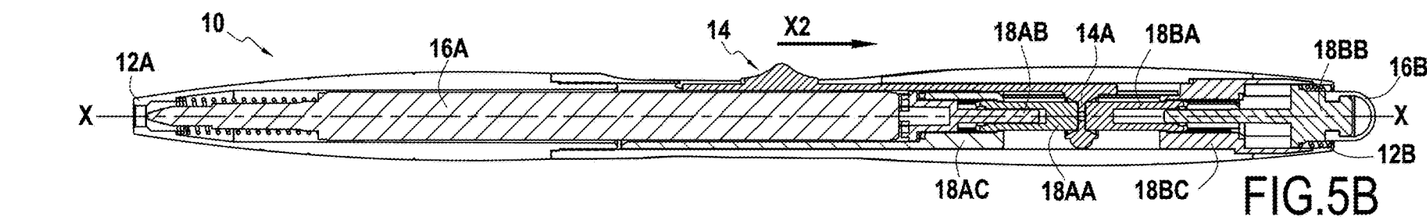
Figure 5C:
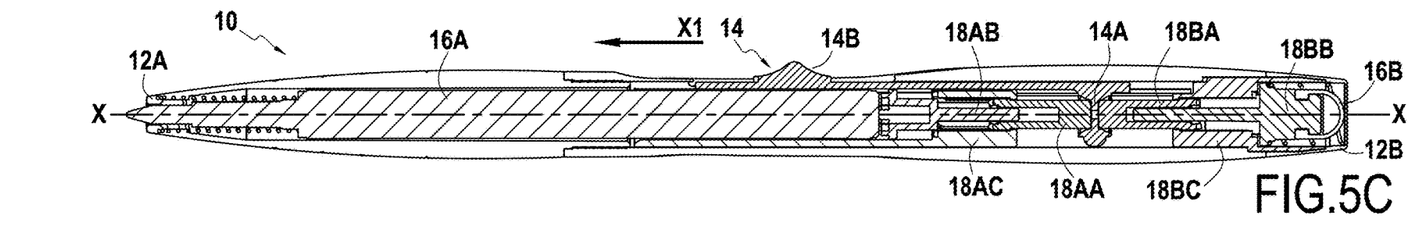
Figure 5D:
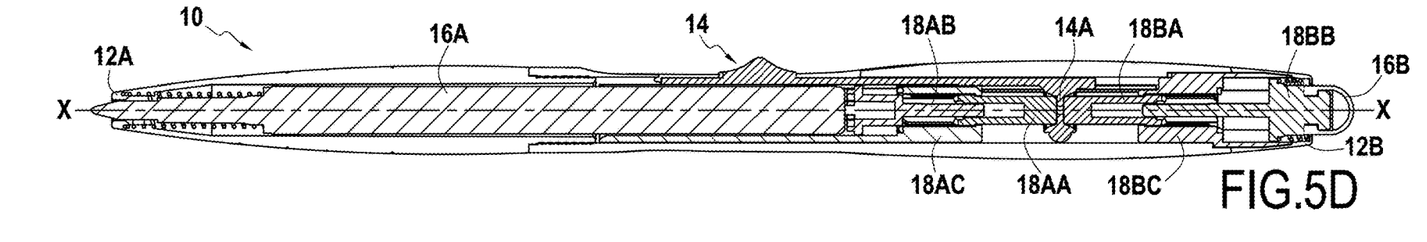

Thus, by operating the button 14 along the axis X in a first direction X1 towards the first head 16A, the first ratchet mechanism 18A is actuated, thereby causing the first head to retract/extend into/out from the casing 12. In FIGS. 5C and 5D, the first head 16A extends from the casing 12; it is thus in the position for use. In FIGS. 5A and 5B, the first head 16A is retracted inside the casing 12; it is thus in the retracted position.

In the same way, by operating the button 14 along the axis X in a second direction X2 towards the second head 16B (i.e. opposite to the first direction X1), the second ratchet mechanism 18B is actuated, thereby causing the head 16B to retract/extend into/out from the casing 12. In FIGS. 5B and 5D, the second head 16A extends from the casing 12; it is thus in the position for use. In FIGS. 5A and 5C, the second head 16B is retracted inside the casing 12; it is thus in the retracted position.

The button 14 cooperates with the first and second ratchet mechanisms 18A and 18B in abutment only, and since these mechanisms are actuated in this example along the same axis but in opposite directions, it is ensured that actuation of one mechanism is totally independent from actuation of the other mechanism and vice versa. A hand held device 10 can therefore be placed very easily in any of the configurations shown in FIGS. 5A to 5D.

Thus, when the button 14 is operated in the direction X1, only the first head 16A is actuated and the second head 16B is not actuated, while when the button 14 is operated in the direction X2, only the second head 16B is actuated and the first head 16A is not actuated. By way of example, in order to pass from the configuration of FIG. 5B to the configuration of FIG. 5C, it is necessary to actuate the button once in the direction X2 in order to retract the second head 16B, and to actuate the button once in the direction X1 in order to extend the first head 16A.

Although the present invention is described with reference to specific examples, it is clear that modifications and changes may be made to these examples without going beyond the general scope of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A hand held device extending along an axial direction, comprising a casing presenting a first distal end and a second distal end opposite the first distal end along the axial direction, a first head that is movable axially between a position for use in which the first head projects from the casing from the first distal end and a retracted position in which the first head is retracted inside the casing, a second head that is movable axially between a position for use in which the second head projects from the casing from the second distal end and a retracted position in which the second head is retracted inside the casing, and a single side button that is configured to bring the first head and the second head, independently of each other, from the retracted position to the position for use and vice versa, the side button cooperating with a first ratchet mechanism in order to cause the first head to pass from the retracted position to the position for use and vice versa, and with a second ratchet mechanism in order to cause the second head to pass from the retracted position to the position for use and vice versa, wherein each of the first and second ratchet mechanisms respectively comprises a first and a second piston, a first and a second rotary cam, a first and a second stationary cam respectively receiving the first and the second rotary cam, and a first and a second spring.

2. A hand held device according to claim 1, wherein the side button is movable axially and includes a single slider cooperating in abutment along the axis both with the first piston and with the second piston.

3. A hand held device according to claim 2, wherein the slider presents a first concavity and a second concavity, both extending axially, the first concavity being oriented towards the first head and configured to receive the first piston, while the second concavity is oriented towards the second head and configured to receive the second piston.

4. A hand held device according to claim 2, wherein the slider presents at least one radial projection configured to limit radial movements of the slider within the casing.

5. A hand held device according to claim 1, wherein the first head cooperates with the first rotary cam by bearing against it, while the second head is mounted on the second rotary cam.

6. A hand held device according to claim 1, wherein the first head is a writing body while the second head is a pad for a capacitive screen.

7. A hand held device according to claim 1, wherein the first head is a writing body with thermochromic ink, while the second head is a friction body for changing the color of the thermochromic ink deposited on a substrate by means of said writing body.

* * * * *